United States Patent [19]
Boyer

[11] 3,789,740
[45] Feb. 5, 1974

[54] ROTARY DEVICE WITH ADJUSTABLE AXIAL BEARING

[76] Inventor: Jean-Jacques Boyer, 95 Quai Winston Churchill, Val De Marne, France

[22] Filed: Mar. 28, 1973

[21] Appl. No.: 345,908

Related U.S. Application Data

[63] Continuation of Ser. No. 126,075, March 19, 1971, abandoned.

[30] Foreign Application Priority Data
Mar. 20, 1970  France .............................. 7010098

[52] U.S. Cl. .............................................. 91/486
[51] Int. Cl. ............................................ F04b 13/04
[58] Field of Search ....................... 91/485, 486, 505

[56] References Cited
UNITED STATES PATENTS

| | | | |
|---|---|---|---|
| 2,155,455 | 4/1939 | Thoma | 91/487 |
| 2,525,979 | 10/1950 | Vickers | 91/486 |
| 2,972,504 | 2/1961 | Baker | 308/207.1 |
| 3,124,079 | 3/1964 | Boyer | 91/505 |
| 3,545,340 | 12/1970 | Bobst | 91/504 |
| 3,253,551 | 5/1966 | Thoma | 91/485 |
| 3,555,049 | 1/1971 | Bobst | 91/489 |

FOREIGN PATENTS OR APPLICATIONS
1,210,681  2/1966  Germany ............................ 91/486

*Primary Examiner*—William L. Freeh
*Attorney, Agent, or Firm*—Young & Thompson

[57] ABSTRACT

A swash plate pump or motor has roller bearing means to receive the axial thrust of the swash plate, in the form of a plurality of axially spaced roller bearing assemblies one of which is fixed and the other or others of which bear axially against a stepped ring piston that defines an annular piston chamber with a stepped portion of the inner side wall of the pump casing. The pressure of the working fluid is supplied to this annular chamber to urge the axially adjustable bearing or bearings in a direction to resist the thrust of the swash plate, with a force that varies as the working pressure.

1 Claim, 1 Drawing Figure

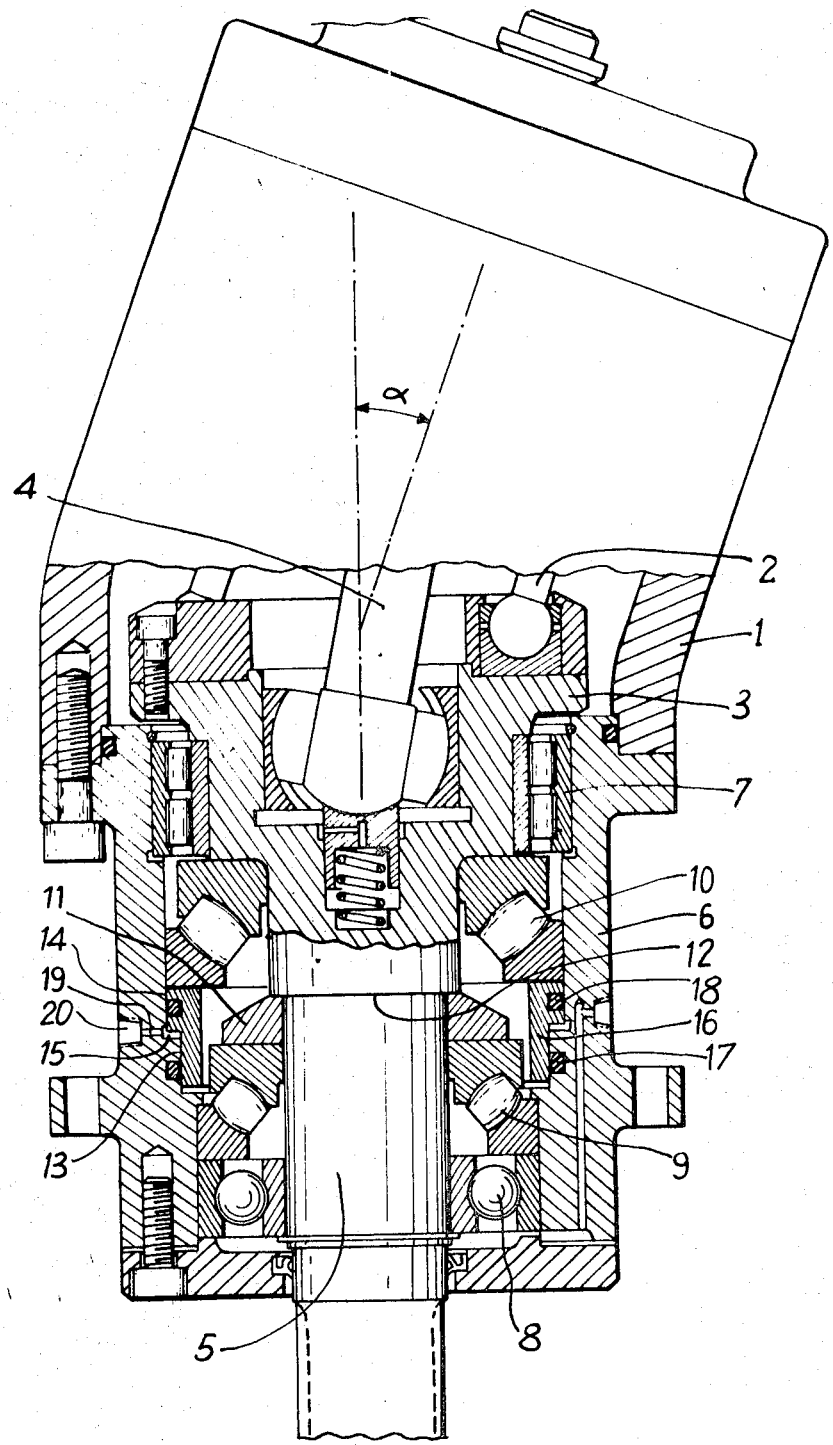

ROTARY DEVICE WITH ADJUSTABLE AXIAL BEARING

This is a continuation of application Ser. No. 126,075, filed Mar. 19, 1971, now abandoned.

The present invention relates to rotary devices with adjustable axial bearings, such as swash plate pumps and motors, of the high pressure hydraulic type. In such pumps and motors, for example, a drive or driven shaft is fixed to and receives thrust from a swash plate against which bear an annular series of rods whose pistons are subjected to extremely high pressure. Because of the high speed of rotation of these devices, it is necessary to reduce the diameters of the anti-friction bearings which receive this axial thrust. It is therefore necessary to provide a plurality of bearings to share the load. At the same time, these bearings which share the load are subjected to rapid wear, so that it is difficult if not impossible evenly to distribute the axial thrust among the bearings.

The object of the present invention is to overcome this difficulty of the known apparatus and to provide such apparatus having at least two roller bearings of the axial thrust type, in which the axial thrust is distributed between or among the bearings despite wear on the bearings.

Briefly, this object is achieved by supporting one of the bearings in fixed relation to the apparatus, and by mounting the other bearing or bearings for movement in a direction to oppose the axial thrust, under the influence of a hydraulic jack.

More particularly, in the case of an expansible chamber device of the type having a swash plate, the cylinder of the hydraulic jack is constituted by a portion of the casing that surrounds the swash plate shaft, this portion of the casing being stepped so as to have two different internal diameters which cooperate respectively with the two different external diameters of a stepped ring in slidable sealing relationship therewith. The steps between the different diameters of the ring and casing define between them an annular piston chamber which is subjected to high pressure fluid, preferably the working fluid of the pump or motor, so that the pressure with which the adjustably mounted bearing or bearings resists the axial thrust varies as the axial thrust itself.

Other objects, features and advantages of the present invention will become apparent from a consideration of the following description, taken in connection with the accompanying drawing, which is a partial cross-sectional view of a swash plate expansible chamber device according to the present invention.

Referring now to the drawing in greater detail, there is shown apparatus according to the present invention, in the form of a pump having a casing 1 in whose upper end is mounted in the usual manner a ring of pistons that reciprocate in a cylinder block (not shown). The rods of these pistons are interconnected by universal joints 2 with the swash plate 3, and the swash plate 3 and cylinder block are driven in conjoint rotation by a double cardan shaft 4 only one of whose ends is shown. The swash plate 3 is carried by a shaft 5 which may be a drive shaft or a driven shaft and in the illustrated embodiment is a drive shaft driven by a motor (not shown). The axes of the shafts 4 and 5 are disposed at an angle α to each other whose magnitude determines the reciprocating stroke of the pistons in the cylinder block. Shaft 5 is mounted coaxially in a cylindrical sleeve 6 comprising a portion of the pump casing, by roller bearings 7 and ball bearings 8. The structure thus far described is of course well known in the art.

According to the present invention, the axial thrust of shaft 5 is received and shared by a plurality of roller bearings, which in the illustrated embodiment are two roller bearings 9 and 10. Roller bearing 9 acts in a conventional manner, its diagonally outer ring or race bearing axially against the outer race of ball bearing 8, and its diagonally inner ring or race bearing axially against a thrust ring 11 fitted on shaft 5 which in turn abuts against an annular abutment shoulder 12 of shaft 5.

The roller bearing 10, however, is mounted according to the invention. To this end, the inner wall of the sleeve 6 is stepped and has two cylindrical surfaces 13 and 14 of different internal diameter separated by an annular recess 15. A ring 16 is correspondingly stepped and has two outer peripheral surfaces of two different diameters corresponding to the diameters of surfaces 13 and 14 and in slidably sealed relation with the surfaces 13 and 14 respectively. Sealing rings 17 and 18 slidably seal the engaged surfaces 13 and 14 with the corresponding surfaces of ring 16 respectively.

A bore 19 through casing sleeve 6 communicates between a connection 20 on the outer wall of sleeve 6 and the annular recess 15. Ring 16 thus constitutes the piston of a hydraulic jack whose cylinder is constituted by a portion of sleeve 6 and whose piston chamber is the annular recess 15. The diagonally outer ring or race of roller bearing 10 bears against the adjacent or larger end of ring 16 while the diagonally inner ring or race of bearing 10 bears against the adjacent side of swash plate 3.

Connection 20 communicates by a conduit (not shown) with the pump chambers (not shown) in the cylinder block described above, and is preferably connected to the pump outlet. In this way, the pressure of the working fluid in the pump is supplied to the piston chamber constituted by recess 15, so that the pressure with which the bearing 10 resists the axial thrust of the swash plate is proportional to the pump pressure and hence proportional to the axial thrust that must be resisted. At the same time, bearing wear does not result in unequal loading of the bearings 9 and 10, because the cylinder and piston assembly by which the bearing 11 is opposed permits the distance between bearings 9 and 10 to vary without alteration of the pressure that is borne by each.

From a consideration of the foregoing disclosure, therefore, it will be evident that the initially recited object of the present invention has been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. In a high pressure swash plate pump or motor, comprising a casing for a ring of pistons that reciprocate in a cylinder block, the pistons having rods interconnected by universal joints to the swash plate, a shaft on which the swash plate is mounted for rotation, said shaft being disposed at an oblique angle to said piston rods and receiving both axial and lateral thrust from said universal joints, and bearing means between said shaft and said casing mounting said shaft in said casing for rotation of said shaft relative to said casing; the improvement in which said bearing means comprises a first conical thrust roller bearing acting between said shaft and said casing in one direction axially of said shaft and a second conical thrust roller bearing acting in said one direction between said shaft and a ring having a stepped external surface in slidably sealed engagement with a correspondingly stepped internal surface of said casing, said stepped surfaces of said ring and casing defining between them an annular piston chamber, and means to supply fluid under pressure to said piston chamber.

* * * * *